(12) United States Patent
Braun et al.

(10) Patent No.: US 12,499,689 B2
(45) Date of Patent: Dec. 16, 2025

(54) METHODS AND SYSTEMS FOR OBJECT TRACKING

(71) Applicant: Aptiv Technologies AG, Schaffhausen (CH)

(72) Inventors: Marco Braun, Düsseldorf (DE); Moritz Luszek, Detmold (DE); Dominic Spata, Witten (DE)

(73) Assignee: Aptiv Technologies AG, Schaffhausen (CH)

( * ) Notice: Subject to any disclaimer, the term of this patent is extended or adjusted under 35 U.S.C. 154(b) by 360 days.

(21) Appl. No.: 18/183,014

(22) Filed: Mar. 13, 2023

(65) Prior Publication Data

US 2023/0316775 A1 Oct. 5, 2023

(30) Foreign Application Priority Data

Mar. 30, 2022 (EP) .................................... 22165563

(51) Int. Cl.
*G06V 20/58* (2022.01)
*G06V 10/82* (2022.01)

(52) U.S. Cl.
CPC .............. *G06V 20/58* (2022.01); *G06V 10/82* (2022.01); *G06V 2201/07* (2022.01)

(58) Field of Classification Search
CPC .... G06V 20/58; G06V 10/82; G06V 2201/07; G06V 10/62; G06N 3/0442; G06N 3/048; G06N 3/045; G06N 3/0464; G06N 3/09; G06N 3/084; G01S 13/726; G01S 13/931; G01S 13/723; G01S 7/415; G01S 7/417
See application file for complete search history.

(56) References Cited

U.S. PATENT DOCUMENTS

| | | | |
|---|---|---|---|
| 11,574,164 B2 * | 2/2023 | Dasgupta | G06N 3/084 |
| 2020/0082248 A1 | 3/2020 | Villegas et al. | |
| 2021/0255304 A1 * | 8/2021 | Fontijne | G06V 20/10 |
| 2022/0026568 A1 | 1/2022 | Meuter et al. | |

OTHER PUBLICATIONS

"Extended European Search Report", EP Application No. 22165563. 2, Oct. 7, 2022, 13 pages.

(Continued)

*Primary Examiner* — Jianxun Yang
(74) *Attorney, Agent, or Firm* — Harness, Dickey & Pierce, P.L.C.

(57) ABSTRACT

The present disclosure relates to methods and systems for object tracking, for example for object detection and grid segmentation using recurrent neural networks. A computer implemented method for object tracking comprises the following steps carried out by computer hardware components: providing random values as a hidden state of a trained neural network for an initial time step, wherein the hidden state represents an encoding of sensor data acquired over consecutive time steps in a grid structure, wherein the hidden state further represents an offset indicating a movement of the object between the consecutive time steps; iteratively determining an updated hidden state by processing a present hidden state and present sensor data using the trained neural network; and determining object tracking information based on the updated hidden state.

19 Claims, 12 Drawing Sheets

(56) References Cited

OTHER PUBLICATIONS

Bieder, et al., "Exploiting Multi-Layer Grid Maps for Surround-View Semantic Segmentation of Sparse LiDAR Data", May 13, 2020, 7 pages.
Chen, et al., "DeepLab: Semantic Image Segmentation with Deep Convolutional Nets, Atrous Convolution, and Fully Connected CRFs", Jun. 2, 2016, 14 pages.
Cho, et al., "Learning Phrase Representations using RNN Encoder-Decoder for Statistical Machine Translation", Sep. 30, 214, 15 pages.
Dai, et al., "Deformable Convolutional Networks", Jun. 5, 2017, 12 pages.
Fernando, et al., "Tracking by Prediction: A Deep Generative Model for Mutli-person Localisation and Tracking", Mar. 2018, 11 pages.
Fischer, et al., "FlowNet: Learning Optical Flow with Convolutional Networks", Apr. 26, 2015, 10 pages.
Gao, et al., "RAMP-CNN: A Novel Neural Network for Enhanced Automotive Radar Object Recognition", Nov. 13, 2020, 15 pages.
Hochreiter, et al., "Long Short-Term Memory", Neural Computation, vol. 9, No. 8, Dec. 1997, 45 Pages.
Hur, et al., "Joint optical flow and temporally consistent semantic segmentation", Jun. 26, 2016, 14 pages.
Ilg, "Flownet 2.0: Evolution of optical flow estimation with deep networks", Dec. 2016, 16 pages.
Jaderberg, et al., "Spatial Transformer Networks", Feb. 4, 2016, 15 pages.
Kendall, et al., "What Uncertainties Do We Need in Bayesian Deep Learning for Computer Vision?", Oct. 5, 2017, 12 pages.
Lecun, et al., "Object Recognition with Gradient-Based Learning", Aug. 2000, 28 pages.
Liat, "Self-Supervised Occupancy Grid Learning From Sparse Radar for Autonomous Driving", Mar. 31, 2019, 9 pages.
Lombacher, et al., "Object classification in radar using ensemble methods", Mar. 2017, pp. 87-90.
Major, et al., "Vehicle Detection with Automotive Radar Using Deep Learning on Range-Azimuth-Doppler Tensors", Oct. 27, 2019, 9 pages.
Milan, et al., "Online Multi-Target Tracking Using Recurrent Neural Networks", Dec. 7, 2016, 9 pages.
Nilsson, et al., "Semantic Video Segmentation by Gated Recurrent Flow Propagation", Oct. 2, 2017, 11 pages.
Ning, et al., "Spatially Supervised Recurrent Convolutional Neural Networks for Visual Object Tracking", Jul. 19, 2016, 10 pages.
Redmon, et al., "You Only Look Once: Unified, Real-Time Object Detection", May 9, 2016, 10 pages.
Schreiber, et al., "Dynamic Occupancy Grid Mapping with Recurrent Neural Networks", May 5, 2022, 8 pages.
Schreiber, et al., "Long-Term Occupancy Grid Prediction Using Recurrent Neural Networks", Jun. 7, 2019, 8 pages.
Schreiber, et al., "Motion Estimation in Occupancy Grid Maps in Stationary Settings Using Recurrent Neural Networks", May 5, 2022, 7 pages.
Schumann, et al., "Semantic Segmentation on Radar Point Clouds", Jul. 2018, pp. 2179-2186.
Shi, et al., "Convolutional LSTM Network: A Machine Learning Approach for Precipitation Nowcasting", Sep. 15, 2015, 12 pages.
Vaswani, et al., "Attention Is All You Need", Dec. 6, 2017, 15 pages.
Weston, et al., "Probably Unknown: Deep Inverse Sensor Modelling In Radar", May 10, 2019, 7 pages.
Wu, et al., "MotionNet: Joint Perception and Motion Prediction for Autonomous Driving Based on Bird's Eye View Maps", Mar. 15, 2022, 11 pages.

\* cited by examiner

METHODS AND SYSTEMS FOR OBJECT TRACKING

INCORPORATION BY REFERENCE

This application claims priority to European Patent Application Number EP 22165563.2, filed Mar. 30, 2022, the disclosure of which is incorporated by reference in its entirety.

BACKGROUND

For Driver Assistance Systems up to fully Autonomous Driving functionalities, various sensor data, for example radar data, is a reliable source of information that can be processed by a system to reason about environmental semantics. As for example, radar sensors return sparse and noisy reflections with a potentially high spatial inaccuracy, temporal integration of consecutive radar scans highly leverages the informative density of the data.

Various approaches for perceiving the environment of a vehicle based on sensor data utilize deep learning methods. For example, these methods extract patterns from radar scans by using neural networks consisting of several consecutive layers to reason about the environment.

However, movement between objects and the ego vehicle may introduce problems in object detection.

Accordingly, there is a need to provide enhanced methods for object detection and grid segmentation.

SUMMARY

The present disclosure relates to methods and systems for object tracking, for example for object detection and grid segmentation using recurrent neural networks. The present disclosure provides computer implemented methods, computer systems, and non-transitory computer readable mediums, including those described in the claims. Embodiments are given in the claims, the description, and the drawings.

In one aspect, the present disclosure is directed at a computer implemented method for object tracking, the method comprising the following steps performed (in other words: carried out) by computer hardware components: providing random values as a hidden state of a trained neural network for an initial time step, wherein the hidden state represents an encoding of sensor data acquired over consecutive time steps in a grid structure, wherein the hidden state further represents an offset indicating a movement of the object between the consecutive time steps; iteratively determining an updated hidden state by processing a present hidden state and present sensor data to obtain an updated hidden state using the trained neural network; and determining object tracking information based on the updated hidden state.

It has been found that using a hidden state that does not only represent previous sensor data, but also includes offsets, spatial-temporal misalignment may be resolved. Spatial-temporal misalignment may for example occur due to objects moving relative to each other, so that in consecutive time steps, the spatial relation between objects changes.

The trained neural network (and the object tracking head) may be trained using commonly used methods, for example by providing sets of measurement data (in other words: sensor data) and ground truth data, and optimizing parameters (for example weights) of the neural network (and the object tracking head) so, that a loss function, for example difference between the output of the neural network (and the object tracking head) and the ground truth data, becomes minimum. The neural network may also be referred to as artificial neural network.

The object tracking information may be determined using a head, which may be a further neural network.

According to various embodiments, iteratively determining the updated hidden state comprises: acquiring the present hidden state for a first pre-determined time step and an offset for the first pre-determined time step; determining a transformed hidden state based on the present hidden state for the first pre-determined time step and the offset for the first pre-determined time step; acquiring sensor data for a second pre-determined time step; evaluating the trained neural network based on the transformed hidden state and the sensor data to obtain intermediate data for the second pre-determined time step; determining an offset for the second pre-determined time step based on the intermediate data; and determining an updated hidden state for the second pre-determined time step based on the intermediate data and the offset for the second pre-determined time step For example, at time t−1, within a neural network (which may be a recurrent neural network), a hidden state $h_{t-1}$ (which may be some encoding of sensor data which is memorized across consecutive time steps in a grid structure) and offsets $off_{t-1}$ (which account for movement per grid cell of underlying objects in between consecutive frames) may be determined. The concatenation of both $off_{t-1}$ and $h_{t-1}$ (which may be denoted as $H_{t-1}$) may then be propagated to time step t. In this time step, $H_{t-1}$ may first be transformed based on $off_{t-1}$ (while transformation may mean $H_{t-1}$ per cell is projected in directions x and y by $off_x$ and $off_y$ to obtain $H_{t-1}'$). In a next step, the projection accuracy may be evaluated by a matching mechanism which determines the similarity of embeddings extracted from the input $E_I(I_t, \alpha_t)$ and embeddings extracted from the hidden state $E_H(h_{t-1}', \alpha_{t-1}')$, as described in more detail below. The transformed hidden state $h_{t-1}'$ may then be processed together with $I_t$ by a neural network which may be a RNN like a LSTM or GRU to obtain $h_t$. This $h_t$ may then be processed by a neural network to determine $off_t$.

For example, the transformation of $H_{t-1}$ to $h'_{t-1}$ and $off_{t-1}$ may be evaluated based on the transformed hidden state ($h'_{t-1}$) and the radar data ($I_t$) to obtain an attention value per cell which is then used to gate both $h'_{t-1}$ and $off_{t-1}$ before $h'_{t-1}$ is processed by the RNN and $off_{t-1}$ can be used to define the offset for time step t.

The sensor data may for example include or be radar data.

The first pre-determined time step may also be referred to as a previous time step. The second pre-determined time step may also be referred to as a present time step or subsequent time step. Data related to the second pre-determined time step may be referred to as "novel" data (for example "novel" sensor scans).

The method may extract motion patterns for cell-wise velocity estimation and may project data over time (in other words: over subsequent frames). The system may be independent of the underlying grid resolution and object speeds.

According to various embodiments, the object comprises an ego vehicle. For example, a sensor for acquiring the sensor data. The ego vehicle may for example be an (at least partially) autonomous vehicle.

According to various embodiments, the object comprises an object different from an ego vehicle.

According to various embodiments, the offset for the first pre-determined time step is determined based on the present hidden state of the first pre-determined time step. It has been found that by embedding the offset into the hidden state, the offset may be "remembered" by the RNN, so that information on the offset may be propagated from one time step to the next time step (i.e. from the first pre-determined time step to the second pre-determined time step).

The offset for the second pre-determined time step may be determined based on the hidden state for the second pre-determined time step. The hidden state for the first pre-determined time step may be composed of the intermediate data of the first pre-determined time step and the offset for the pre-determined time step.

According to various embodiments, the updated hidden state is determined further based on concatenating the intermediate data and the offset for the second pre-determined time step. The concatenating may provide that the intermediate data and the offset may be handled by the RNN.

According to various embodiments, the updated hidden state is determined further based on the offset for the first pre-determined time step. Using the offset for the first pre-determined time step and the offset for the second pre-determined time step may provide enhanced results.

According to various embodiments, the updated hidden state is determined further based on a mean of the offset for the first pre-determined time step and the offset for the second pre-determined time step. It has been found that using the mean provides an efficient way of combining the offset for the first pre-determined time step and the offset for the second pre-determined time step.

According to various embodiments, the updated hidden state is determined further based on an attention method based on the offset for the first pre-determined time step and the offset for the second pre-determined time step. Using the attention method may provide a weighted sum of the offset for the first pre-determined time step and the offset for the second pre-determined time step, and may thus provide enhanced results.

According to various embodiments, the method further comprises: determining second intermediate data based on the transformed hidden state using a matching method; wherein the trained neural network is evaluated based on the second intermediate data, for example based on a similarity between the transformed hidden state and the sensor data for the second pre-determined time step. Using the matching method may provide that not only an offset provided by the RNN is used, but that also the offset provides a good match between the first pre-determined time step and the second pre-determined time-step.

According to various embodiments, the matching method comprises determining a similarity between an embedding vector of the first pre-determined time step and an embedding vector of the second pre-determined time step.

According to various embodiments, the embedding vector of the first pre-determined time step comprises an embedding based on the transformed hidden state for the first pre-determined time step.

According to various embodiments, the embedding vector of the second pre-determined time step comprises an embedding based on the sensor data for the second pre-determined time step.

According to various embodiments, the similarity is determined based on a dot product between the embedding vector of the first pre-determined time step and the embedding vector of the second pre-determined time step.

The matching allows the approach to validate its transformation. By doing so, poor transformations (with a low similarity between source and target cells) may be suppressed while good transformations may be supported.

According to various embodiments, the updated hidden state for the second pre-determined time step is determined based on speed matching. The speed matching may provide that speed of objects is taken into account. For example, speed matching may mean that a weighted sum between offsets for the first pre-determined time step and the second pre-determined time step is used based on the matching operation.

According to various embodiments, the offset for the second pre-determined time step is determined based on sampling. Sampling may provide that not only a (single) offset is considered, but several offsets which are sampled.

According to various embodiments, the sampling is based on Gaussian distribution. It has been found that the Gaussian distribution provides a realistic yet efficient distribution.

According to various embodiments, the trained neural network comprises a recurrent neural network, for example at least one of long short-term memory or gated recurrent units. It will be understood that any other recurrent neural network (i.e. a neural network with some kind of memory) may be used.

According to various embodiments, the method further comprises: carrying out at least one of object detection or grid segmentation based on the updated hidden state for the second pre-determined time step. It will be understood that any other kind of detection may be provided. For each kind of detection (for example object detection or grid segmentation), a specific head may be provided.

In another aspect, the present disclosure is directed at a computer implemented method for object detection, the method comprising the following steps carried out by computer hardware components: acquiring a hidden state for a first pre-determined time step; determining a revised hidden state based on the hidden state using at least one of a dilated convolution or a dynamics deformable convolution; acquiring sensor data for a second pre-determined time step; and processing the revised hidden state and the sensor data using a recurrent neural network to obtain a hidden state.

In another aspect, the present disclosure is directed at a computer system, said computer system comprising a plurality of computer hardware components configured to carry out several or all steps of the computer implemented methods described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system as described herein and a sensor configured to acquire the sensor data.

In another aspect, the present disclosure is directed at a non-transitory computer readable medium comprising instructions for carrying out several or all steps or aspects of the computer implemented methods described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE FIGURES

Example embodiments and functions of the present disclosure are described herein in conjunction with the following drawings, showing schematically.

DETAILED DESCRIPTION

Figure 1:
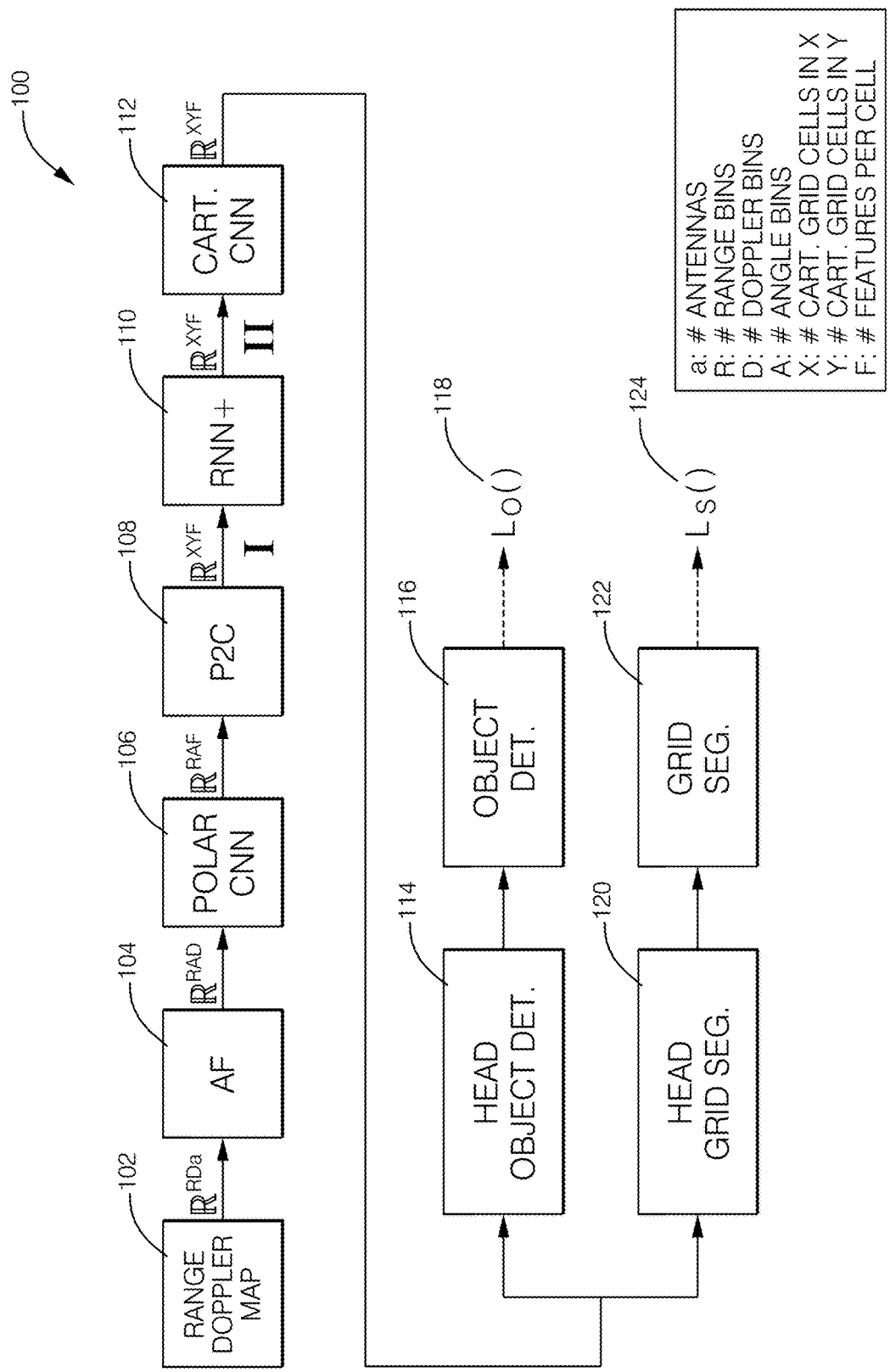
FIG. 1 is an illustration of a general structure of a system according to various embodiments.

In deep learning (DL) models, Recurrent Neural Network (RNN) layers like LSTMs (long short-term memory) or GRUs (gated recurrent units) are utilized to efficiently and effectively process sequential data. Therefore, RNNs can be applied to consume radar scans to integrate environmental information over time. RNNs process a Hidden State (which may be denoted by H) which contains accumulated features from all previous radar scans up to T=t−1 (in other words up to the previous time step) as well as an input (which may be denoted by I) that contains novel radar features from T=t (wherein t may denote the present time step). An index may be used to denote the respective time step.

By matching $H_{t-1}$ and $I_t$, the network may be able to increase the informative density from radar recordings as well as extract patterns across consecutive frames. Scene dynamics like the ego motion of the host vehicle as well as movements from detected objects, however, may cause misalignment between features $H_{t-1}$ from the Hidden State as well as novel Input features $I_t$. While the ego motion may be compensated by awareness about movement of the ego car, misalignment between $H_{t-1}$ and $I_t$ caused by external movement may not be compensated. This may cause an error that is inherent in every recurrent network unit that is used to process consecutive radar scans.

In order to overcome the described problem of misalignment between H and I within the Recurrent Unit or the RNN, filters within the RNN may match correlating artefacts between past and novel frames. For example, if patterns from a moving object are present in both feature maps of H and I, the RNN may recognize the spatial misalignment by applying a discrete filter $f_\Theta$ with learned weights $\Theta$ across M×N grid cells. Misalignment of embeddings between H and I may then be interpreted by the network as a movement of the underlying object between t−1 and t. The ability of the network to recognize this movement, however, may strongly correlate with the applied filter size.

For example, a filter of size 3×3, applied on a grid map of cell size $(0.5 \text{ m})^2$ with a temporal difference ΔT between two consecutive frames of 50 ms may be able to account for movement in longitudinal and lateral directions of 10 m/s which may not be enough for movements on the highway of up to 130 km/s=36.1 m/s.

Increasing the filter size may solve this problem. However, in order to recognize a movement of 130 km/h with the setup described in the example above, filters of size 9×9 need to be employed, which may significantly increase time complexity of this approach. Furthermore, a finer grid resolution may further leverage the presented problem as with finer grid resolutions, kernel sizes need to be increased to maintain the maximum possible velocity that can be captured by a single filter.

According to various embodiments, scene dynamics may be derived on a cell-wise basis by using recurrent cell for processing radar or lidar data. Cell-wise speed estimation as estimated according to various embodiments may then be used to enrich the output semantics of the applied system. For example, for a system that performs grid segmentation, a cell-wise speed may be predicted in addition to class probabilities. According to various embodiments, data within the network is stored in cells similar to pixels in images. In order to account for movements of objects that are in some way represented in this grid structure, a prediction of a movement for each cell may be provided. Class probabilities may be obtained by processing network logics by a softmax function so that each cell contains values (between 0 and 1) which sum up to 1.

FIG. 1 shows an illustration 100 of a general structure of a system according to various embodiments. FIG. 1 shows the general network layout for processing radar data for the task of object detection and grid segmentation while utilizing a modified Recurrent Neural Network which is described in various embodiments further below. The modified Recurrent Neural Network (RNN) may be a generic RNN with additional functionality, and may therefore be referred to as RNN+.

In more detail, radar sensor returns (in other words: radar sensor data) in the form of range-doppler matrices across antennas (which may be referred to as Range-Doppler map 102) may be processed by extracting spatially local correlations within the radar data followed by a transformation to a cartesian system containing X×Y grid cells. In detail, the Range-Doppler map 102 is provided to an angle finding module 104, followed by a polar CNN (convoluted neural network) 106, followed by a polar-to-cartesian (P2C) converter 108. The output of the P2C converter 108 may be referred to as "I". It will be understood that although radar data is used as an example of sensor data, the methods and systems according to various embodiments may be applied to any kind of sensor data when sensor data is sequentially processed.

Data in I may then be processed by the RNN+ module 110 which is described in more detail below. An output of the RNN+ 110 may be a feature map (which may be denoted by "II"), and which may then be processed according to some task like object detection 116 (with a related loss function 118) or grid segmentation 122 (with a related loss function 124), for example after being processed by a Cartesian CNN 112, and respective heads (an object detection head 114 and/or a grid segmentation head 120). Every module shown in FIG. 1 except for the RNN+ 110 are placeholders for neural network based layers.

According to various embodiments, various modifications to the RNN+ 110 shown in FIG. 1 may be provided, and will be described in the following.

In the following, an approach of increasing the receptive field by employing dilated convolutions will be described.

Figure 2:
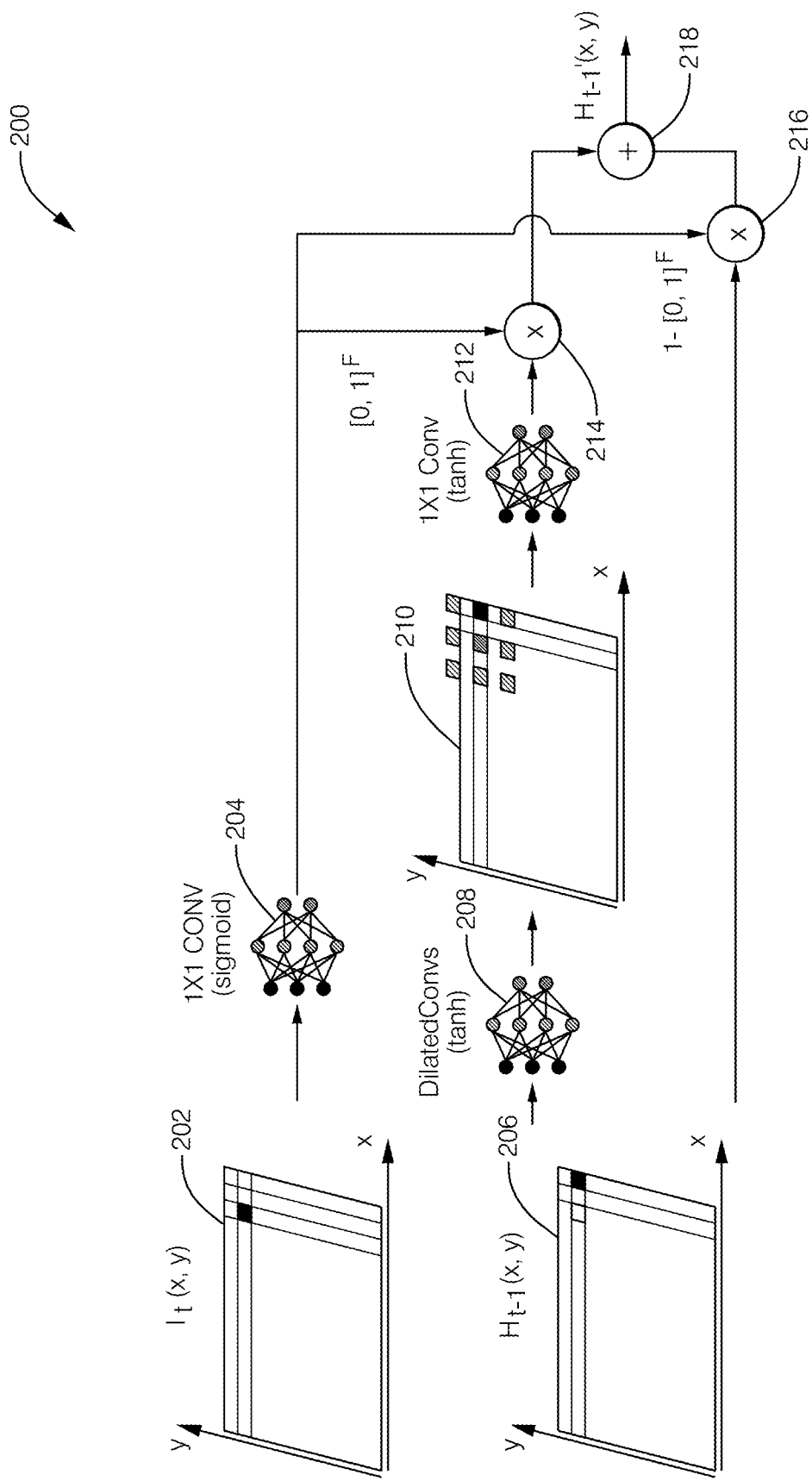
FIG. 2 is an illustration of recognition of dynamics within hidden state and input utilizing attention on dilated convolutions according to various embodiments.

According to various embodiments, the receptive field of the kernel within RNN+ may be increased by employing dilated convolutions as depicted in FIG. 2.

FIG. 2 shows an illustration 200 of recognition of dynamics within hidden state H 206 and input I 202 utilizing attention on dilated convolutions according to various embodiments.

According to various embodiments, the RNN+ may use at least one convolution 208 with a dilation rate >1 to process the hidden state H 206. By applying dilated convolutions, an increase of the receptive field may be achieved without increasing the temporal complexity of the network.

Furthermore, a 1×1 convolution 204 with a sigmoid activation function (if only 1 dilated convolution is used) or a softmax function (if more than 1 dilated convolutions are used) processes the current input to RNN+, $I_t$ 202, to extract attention scores [0, 1]. These attention scores may then be used to calculate a weighted sum across feature maps that were derived from various dilation rates and therefore various receptive fields.

For example, information may be fetched from cells 210 when a dilation rate of 2 is applied.

A 1×1 convolution 212 may process the feature map resulting from dilated convolutions. This may give the network the opportunity to align this feature map to how the data stream in the hidden state is interpreted by the network.

Operations 214, 216, and 218 provide a weighted sum between unprocessed features in H and features from different dilation rates. For example, per cell, the network may perform an addition between these differently weighted data streams.

Illustratively speaking, the approach illustrated in FIG. 2 captures dynamics between H and I by utilizing 3×3 Convolutions with varying dilation rates for processing H. Further, an attention mechanism consisting of a Convolutional Neural Network (CNN) processing I may attend outputs from the dilated CNNs. The resulting H may then be processed by an RNN.

The approach illustrated in FIG. 2 may increase the receptive field without significantly increasing the network size and may therefore be used to efficiently recognize movements of objects between $H_{t-1}$ and $I_t$. However, motion capturing may still be dependent on network design: Even the highest receptive field may be insufficient for recognizing high speeds. This circumstance becomes worse with finer grid resolutions. Furthermore, regarding implicit learning of movements, it is not clear that the network learns how to transform features in $H_{t-1}$ to resolve misalignment to $I_t$. This means that it is not clear what the artificial neural network actually learns, and it might be that the artificial neural network learns to provide improved results by learning other effects.

In the following, an approach which overcomes these drawbacks and which using dynamic deformable convolutions that use speed estimations to define sampling locations will be described.

Figure 3:
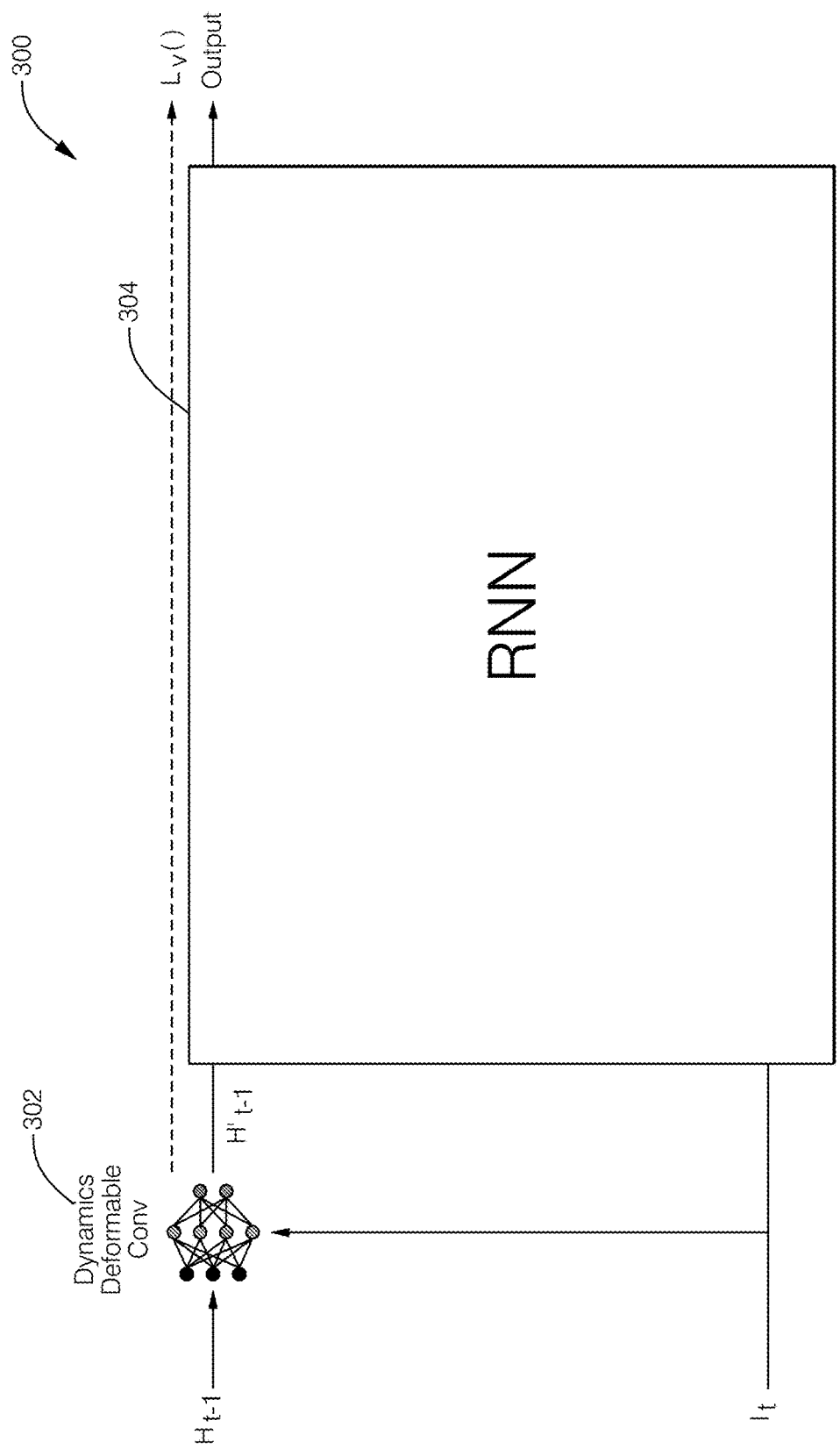
FIG. 3 is an illustration of a scheme for dynamic deformable convolutions as an implementation of RNN+ according to various embodiments.

FIG. 3 shows an illustration 300 of a scheme for dynamic deformable convolutions as an implementation of RNN+ according to various embodiments.

A Dynamics Deformable Cony (DDC) 302 is provided, for example a 3×3 Deformable Convolutions processing $H_{t-1}$, therefore the transformation is defined as $DDC_\Theta(H_{t-1})$ with learned weights $\Theta$. Offsets that define sampling locations in $H_{t-1}$ are a function of $I_t$, Offsets=$DDC^{Offsets}_\Theta(I_t)$. For offsets that correlate with the movement of the underlying objects, the network can then resolve misalignment and aggregate information from $H_{t-1}$ and $I_t$.

RNN+ may be an extension of RNN, wherein H is preprocessed before being provided to the RNN. For example, in the embodiment described above, the preprocessing is the processing using the DDC. In other words, RNN+ defines an extension of an arbitrary RNN with certain improvements like spatio-temporal alignment between $H_{t-1}$ and $I_t$ or unbounded extraction of dynamics.

The hidden state, after being processed by the DDC 302, is then provided to the RNN 304.

The offsets within DDC may indicate from which position on the grid map the convolution should fetch information. For moving objects, these objects should therefore be similar to this movement so that the information can be fetched from the right position. Accordingly, as the offsets resulting from $DDC^{Offsets}_\Theta(I_t)$ align with the movement of underlying objects, an auxiliary loss $L_{I_t}(\ )$ may be implemented to learn these offsets in a supervised manner. Therefore, Ground Truth GT that contains speed vectors $V_{GT, X}$ and $V_{GT, Y}$ may be used, that, given the temporal difference $\Delta T$ between two consecutive frames, can be transferred to $Off_{GT}=V_{GT}*\Delta T$. The training objective of the network may be extended by a regression loss function like Mean Squared Error or Smooth L1 Loss to minimize the difference between $DDC^{Offsets}_\Theta(I_t)$ and $Off_{GT}$. GT may be obtained by a lidar sensor to predict bounding boxes of objects. Velocity of objects may then be calculated by the spatial displacement of bounding boxes between subsequent frames.

As shown in FIG. 3, a modified version of deformable convolutions may be used so that offsets that define sampling locations in H are predicted based on I. Illustratively speaking, the dilution rate of the DDC may be variable. This approach may be referred to as Dynamic Deformable Convolutions (DDC). Sampled values from H may then be processed by a CNN. The offset then defines where the convolution should fetch the information from the input feature map from. For a consistent frame rate, predicted offsets may be scaled to define speed vectors of the underlying objects and may be learned in a supervised fashion. Therefore the training objective may be extended by an auxiliary loss function to minimize the error between predicted speed and actual speed of objects in the scene. The resulting H may then be processed by an RNN.

While DDC may transform $H_{t-1}$ without any limitation regarding the underlying speed and with reliable, because verifiable, success due to utilization of $L_V(\ )$, speed may only be regressed based on the feature map from the current input frame $I_t$. Radar data of one frame, however, may be sparse, noisy and spatially inaccurate which is one of the reasons why an RNN is utilized in the framework presented in FIG. 1.

According to various embodiments, regression of speed vectors to transform $H_{t-1}$ may be further improved by processing both $H_{t-1}$ and $I_t$ in an approach which transforms the Hidden State based on regressed velocity estimates to compensate misalignment between $H_{t-1}$ and $I_t$. In the following, this approach of recurrent extraction of motion patterns for cell-wise velocity estimation and projection of data over time will be described.

Figure 4:
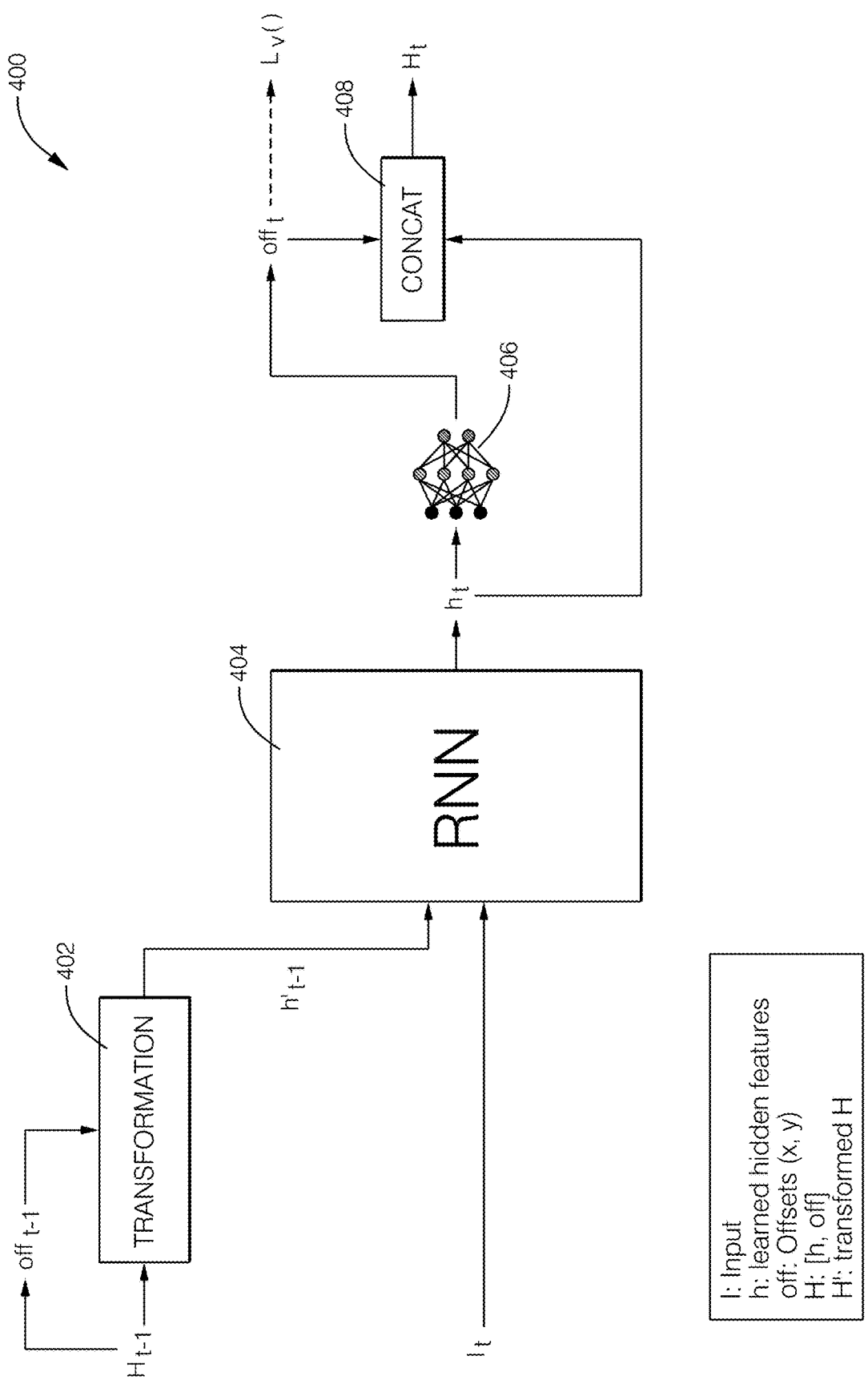
FIG. 4 is an illustration of transforming H based on regressed offsets indicating underlying movement according to various embodiments.

FIG. 4 shows an illustration 400 of transforming H based on regressed offsets indicating underlying movement according to various embodiments.

The output of the RNN 404, $h_t$, is processed together with $\alpha_t$ by a neural network 406 to predict offsets off$_t$ for each cell, where $\alpha_t$ defines the respective angle of each cell relative to the moving direction of the Ego Vehicle. The cells may be defined comparable to pixels in images. The angle may be the angle under which the radar sensor has seen the object rotated in a way that 0° defines the longitudinal axis of the vehicle. Comparable to the approach described above, off$_t$ may align with the movement of underlying objects, so an auxiliary loss $L_V(\ )$ may be implemented to learn these offsets in a supervised manner. For example, the offsets may define to which position information should be projected (for example based on the underlying speed). Therefore, GT that contains speed vectors $V_{GT, X}$ and $V_{GT, Y}$ may be used, that, given the temporal difference $\Delta T$ between two consecutive frames, may be transferred to Off$_{GT}$=$V_{GT}$*$\Delta T$. The training objective of the network may be extended by a regression loss function like Mean Squared Error or Smooth L1 Loss to minimize the difference between off$_t$ and Off$_{GT}$. GT may be obtained by a lidar sensor to predict bounding boxes of objects. Velocity of objects may then be calculated by the spatial displacement of bounding boxes between subsequent frames.

As shown in FIG. 4, Off$_t$ and $h_t$ are concatenated (408) to define the output of RNN+, $H_t$. During the next forward pass, Offsets off$_{t-1}$ may then be extracted back from $H_t$ to transform $H_t$. In this transformation 402, features of each grid cell are shifted as defined by offsets off$_{t-1}$.

If two or more feature vectors compete for the same target cell, the mean across (the competing) feature vectors is assigned to the target cell. For example, it may happen that two feature vectors are projected to the same target location. In that case, a handling of this competition may be defined as only one feature vector may be processed from that point on. There are several possible methods for that: For example, every competing feature vector may elementwise be compared to each other and then the mean, or sum, or max entry of the first, second, . . . entry of the competing vectors may be calculated. The result of this calculation may then be used as the feature vector which is processed from that point onwards.

The more off$_{t-1}$ aligns with Off$_{GT, t-1}$, the better the transformation matches the underlying movement of objects. The transformed Hidden State H'$_{t-1}$ is then consumed by an arbitrary RNN 404 (which may for example be a GRU or an LSTM, together with the novel input $I_t$, i.e. with the input of the current time step).

The approach as depicted in FIG. 4 may therefore learn to predict the movement of objects that are captured by radar sensors and then resolve the misalignment that is caused by the inherent spatial inaccuracy of the Hidden State.

Illustratively speaking, as shown in FIG. 4, offsets are predicted based on the output of the RNN 404 at time T−1 utilizing an auxiliary loss as defined previously. Since the loss is used for training, the loss implicitly influences the prediction.

These offsets may then be used during the subsequent forward pass of the network at T to shift H so that misalignment of patterns resulting from moving vehicles between H and I is resolved.

According to various embodiments, a weighted sum between predicted offsets from T−1 and T may be used to stabilize predicted offsets, as will be described in the following.

Figure 5:
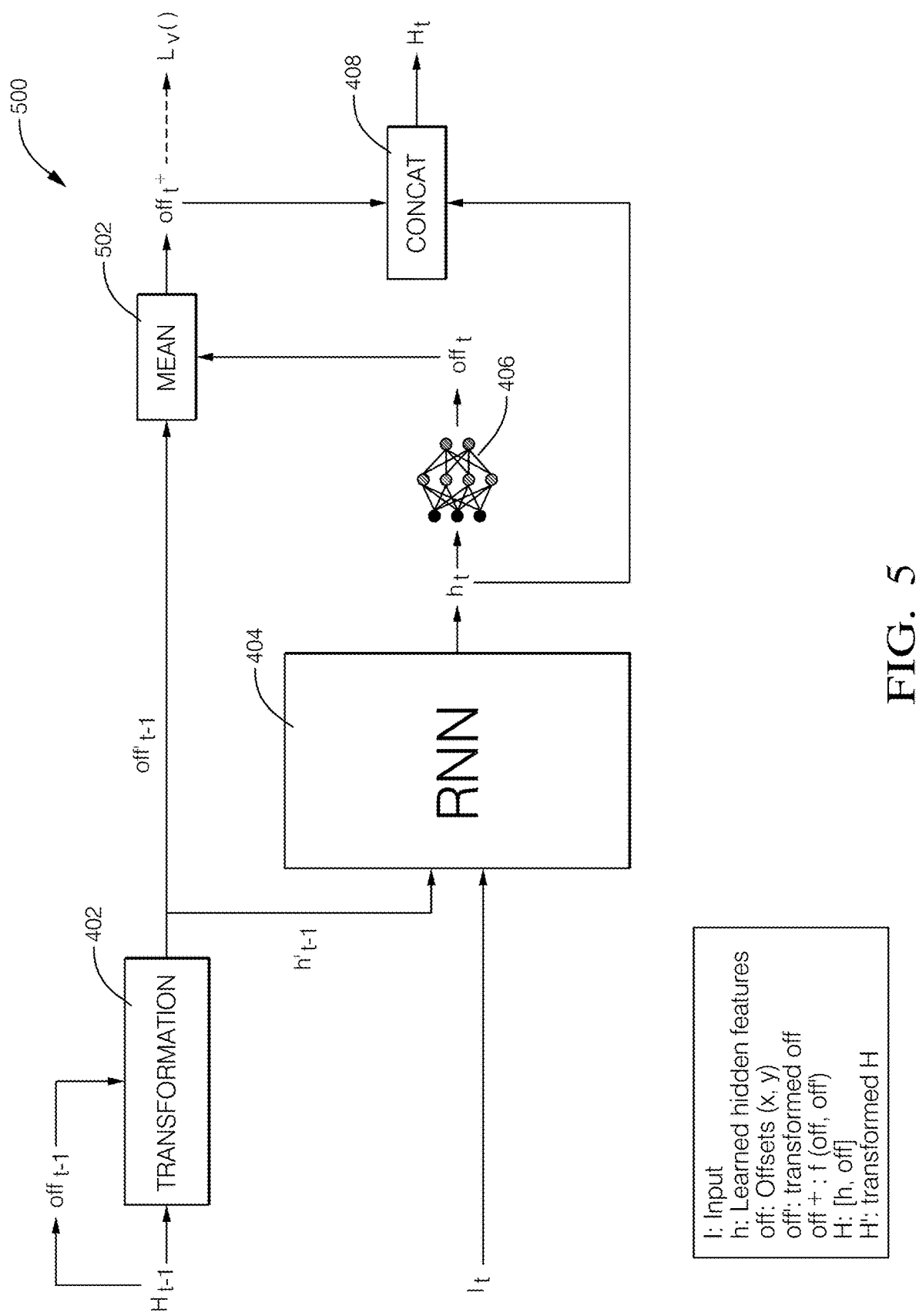
FIG. 5 is an illustration of transforming H based on regressed offsets indicating underlying movement and using a balance between past and novel offsets performed by mean according to various embodiments.

FIG. 5 shows an illustration 500 of transforming H based on regressed offsets indicating underlying movement and using a balance between past and novel offsets performed by mean 502 according to various embodiments. Various portions of the illustration 500 of FIG. 5 may be similar or identical to portions of the illustration 400 of FIG. 4, so that the same reference signs may be used and duplicate description may be omitted.

Figure 6:
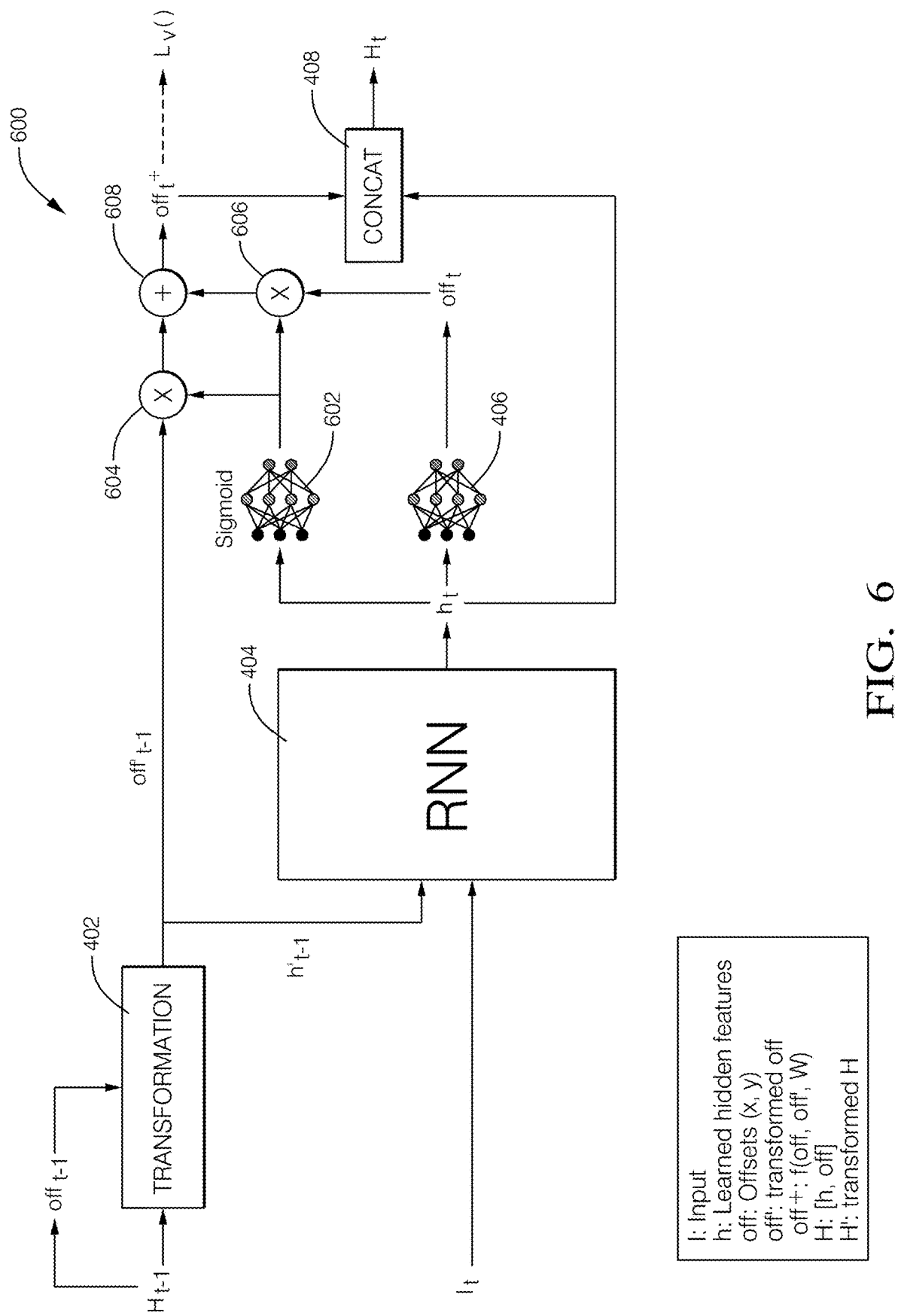
FIG. 6 is an illustration of transforming h based on regressed offsets indicating underlying movement and an attention mechanism to balance between past and novel offsets according to various embodiments.

FIG. 6 shows an illustration 600 of transforming h based on regressed offsets indicating underlying movement and an attention mechanism (or attention method) to balance between past and novel offsets according to various embodiments. The attention mechanism may include a sigmoid function 602, which provides a weight, based on which the offset of the previous time set and the offset of the present time step are weighted using multiplications 604 and 606 and summation 608. Various portions of the illustration 600 of FIG. 6 may be similar or identical to portions of the illustration 400 of FIG. 4, so that the same reference signs may be used and duplicate description may be omitted.

As described above, the prediction of off$_t$ can further be refined by applying a weighted sum between past and novel predictions of offsets as presented in FIG. 4 and FIG. 5. Weighting between transformed offsets from the previous forward pass off$_{t-1}$ and the present offset off$_t$ may be carried out by a mean function (as illustrated in FIG. 5) or an attention mechanism utilizing a 2D Convolutional layer with a sigmoid activation function 602 (as shown in FIG. 6).

According to various embodiments, the approaches illustrated in FIG. 4, FIG. 5, and FIG. 6 may further be improved if patterns from $H_{t-1}$ are projected to possible target destinations where a correlation and matching validation is performed based on patterns from novel sensor scans (I) at the target location. According to various embodiments, the transformation operation illustrated in FIG. 4, FIG. 5 and FIG. 6 may be extended by a matching functionality as described with reference to FIG. 7, FIG. 8 and FIG. 9 below.

Figure 7:
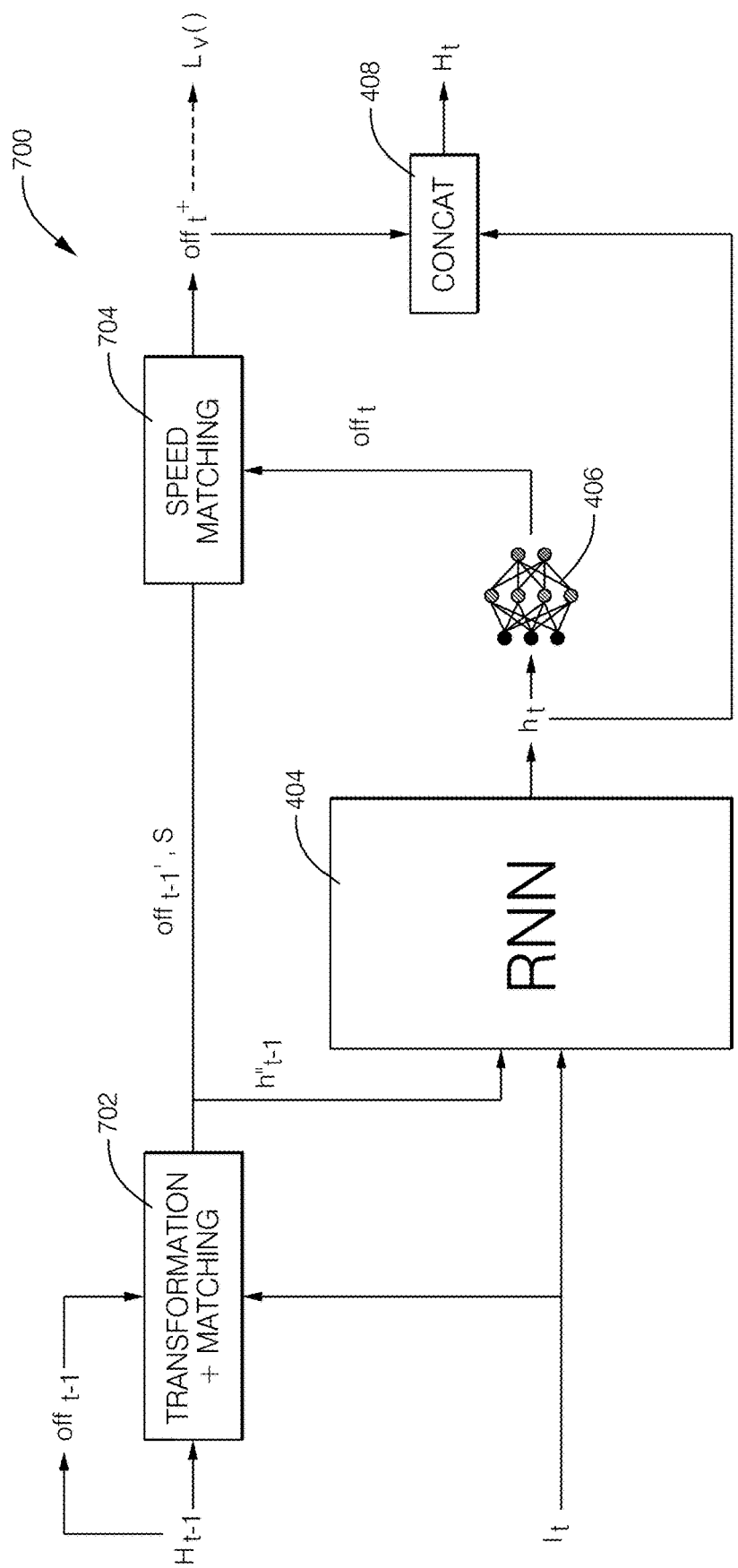
FIG. 7 is an illustration of transforming H based on regressed offsets indicating underlying movement and a matching mechanism between patterns in H projected to the future frame and patterns from novel sensor scans at the projection target position according to various embodiments.

FIG. 7 shows an illustration 700 of transforming H based on regressed offsets indicating underlying movement and a matching mechanism between patterns in H projected to the future frame and patterns from novel sensor scans at the projection target position according to various embodiments. Various portions of the illustration 700 of FIG. 7 may be similar or identical to portions of the illustration 400 of FIG. 4, so that the same reference signs may be used and duplicate description may be omitted. A transformation and matching block 702 and a speed matching block 704 may be provided.

Figure 8:
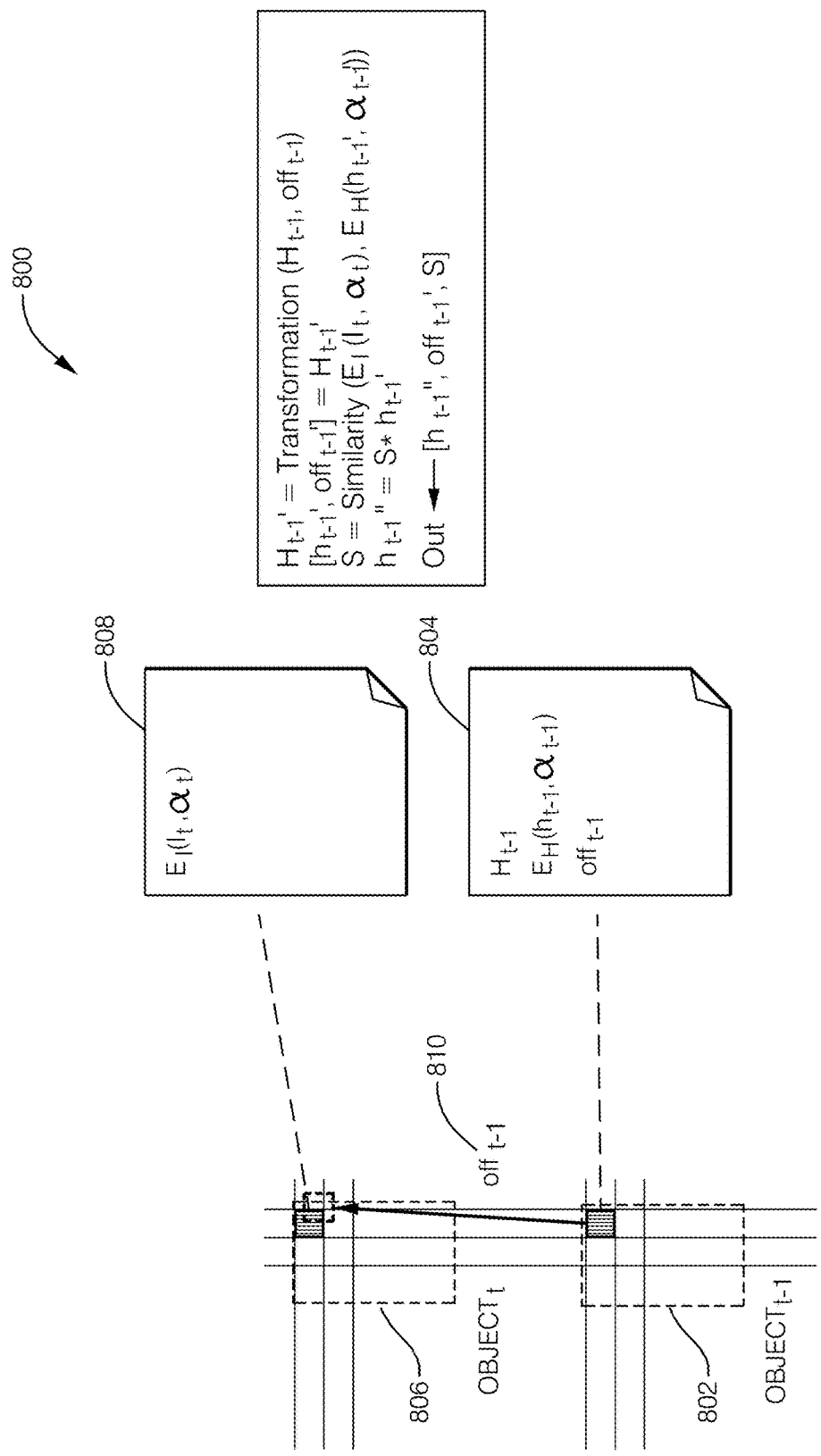
FIG. 8 is an illustration of functionality within the transformation and matching block shown in FIG. 7 according to various embodiments.

FIG. 8 shows an illustration 800 of functionality within the transformation and matching block 702 shown in FIG. 7 according to various embodiments. The illustration 800 shows the outline of one object 802 in t−1 together with its features and predicted offsets on a cell-wise basis. $H_{t-1}$ is then projected to its assumed position based on predicted offsets $\text{off}_{t-1}$ 810. Furthermore, an embedding vector may be derived for each cell in $H_{t-1}$ and $I_t$ by processing both $H_{t-1}$ and $I_t$ by one or more dense layers whose weights are learned by backpropagation. For each projected $H_{t-1}'$, the projected embedding vector $E(H_{t-1}', \alpha_t)$ 804 may be compared with the embedding vector $E(I_t, \alpha_t)$ 808 of the target position (of object 806 at time t) by a similarity function to validate the correlation between underlying objects, where $\alpha_t$ defines the respective angle of each cell relative to the moving direction of the Ego Vehicle. For example, a dot product between $E(H_{t-1}', \alpha_t)$ and $E(I_t, \alpha_t)$ may be used to receive a similarity factor S. Embeddings are cell-wise vectors that are extracted by the mentioned dense layers. As these layers are learned by backpropagation, the network may decide how these layers are determined.

Figure 9:
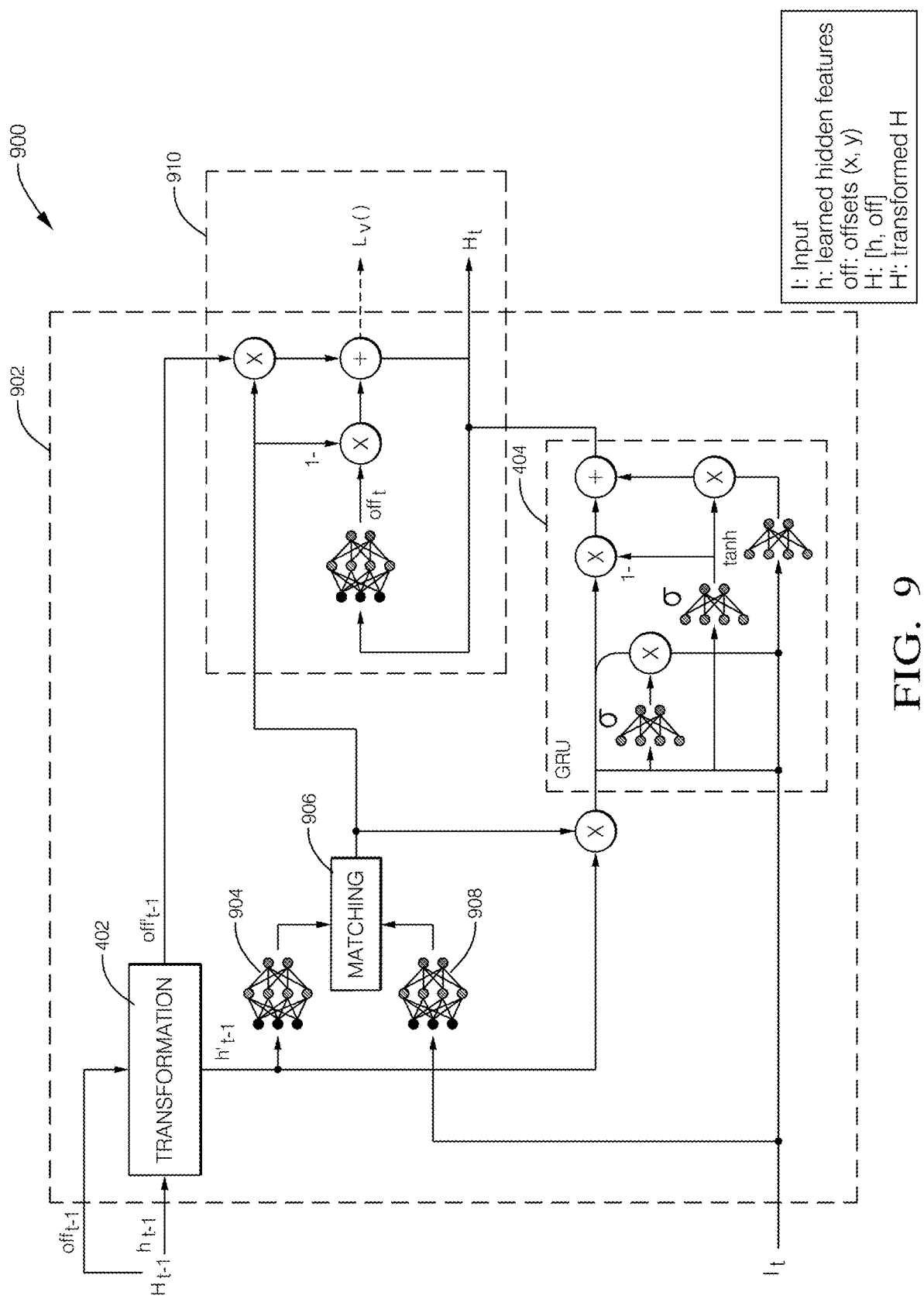
FIG. 9 is an illustration of a recurrent module as illustrated in FIG. 7 according to various embodiments.

FIG. 9 shows an illustration 900 of a recurrent module 902 as illustrated in FIG. 7 according to various embodiments. Various portions of the illustration 900 of FIG. 9 may be similar or identical to portions of the illustration 400 of FIG. 4, so that the same reference signs may be used and duplicate description may be omitted. A matching block 906 may process data provided by a neural network 904 (which takes the hidden state of the previous time step as input) and a neural network 908 (which takes the input of the present time step as input).

The operators illustrated by dashed box 910 define a weighted sum between $\text{off}_{t-1}'$ and $\text{off}_t$ (similar to the weighted sum mechanism 604, 606 and 608 of the embodiment shown in FIG. 6). In FIG. 9 however, the weights for both inputs may be determined by how well the projection matches as defined in 906 (while this weighting is defined by the sigmoid function 602 in the embodiment of FIG. 6).

The similarity factor S may be used to weight the transformed hidden state $h_{t-1}'$ before it gets processed by a recurrent unit 404 like a LSTM or GRU as shown in FIG. 7 and FIG. 9.

The output $h_t$ of the recurrent unit 404 (for example GRU) may then be used together with $\alpha_t$ to predict offsets $\text{off}_t$ that estimate the movement of the underlying object within ΔT. A weighted sum between novel predicted offsets $\text{off}_t$ and offsets from the previous state $\text{off}_{t-1}'$ is then performed using the similarity measure S as depicted in FIG. 9 (which may be written in the following equation:

$$\text{off}_t^+ = S * \text{off}_{t-1}' + (1-S) * \text{off}_t).$$

The output and hidden state of the recurrent cell may then be defined by a concatenation of $\text{off}_t^+$ and $h_t$.

Illustratively speaking, as shown in FIG. 7, FIG. 8, and FIG. 9, a "transformation and matching" operation may be used that extracts embeddings $E(H_{t-1}', \alpha_t)$ and $E(I_t, \alpha_t)$ that are processed by a similarity function like a dot product to return a similarity scalar. This scalar may then be used to scale $h_{t-1}'$ and also to perform a weighting between projected offsets from the previous frame $\text{off}_{t-1}'$ and novel predicted offsets $\text{off}_t$ by calculating a weighted sum $\text{off}_t^+ = S * \text{off}_{t-1}' + (1-S) * \text{off}_t$.

In addition to the previously described methods, the predicted offsets may be defined by two normal distributions $X = N(\mu_x, \sigma_x)$ and $Y = N(\mu_y, \sigma_y)$ where μ defines the predicted mean and σ defines the predicted standard deviation for both directions x and y. Offsets may be learned isotropically so that $\sigma_x = \sigma_y$. With every forward pass, offsets may then be sampled from $\text{off}_{t-1, X} \sim N(\mu_x, \sigma_x)$ and $\text{off}_{t-1, Y} \sim N(\mu_y, \sigma_y)$ as illustrated in FIG. 10.

Figure 10:
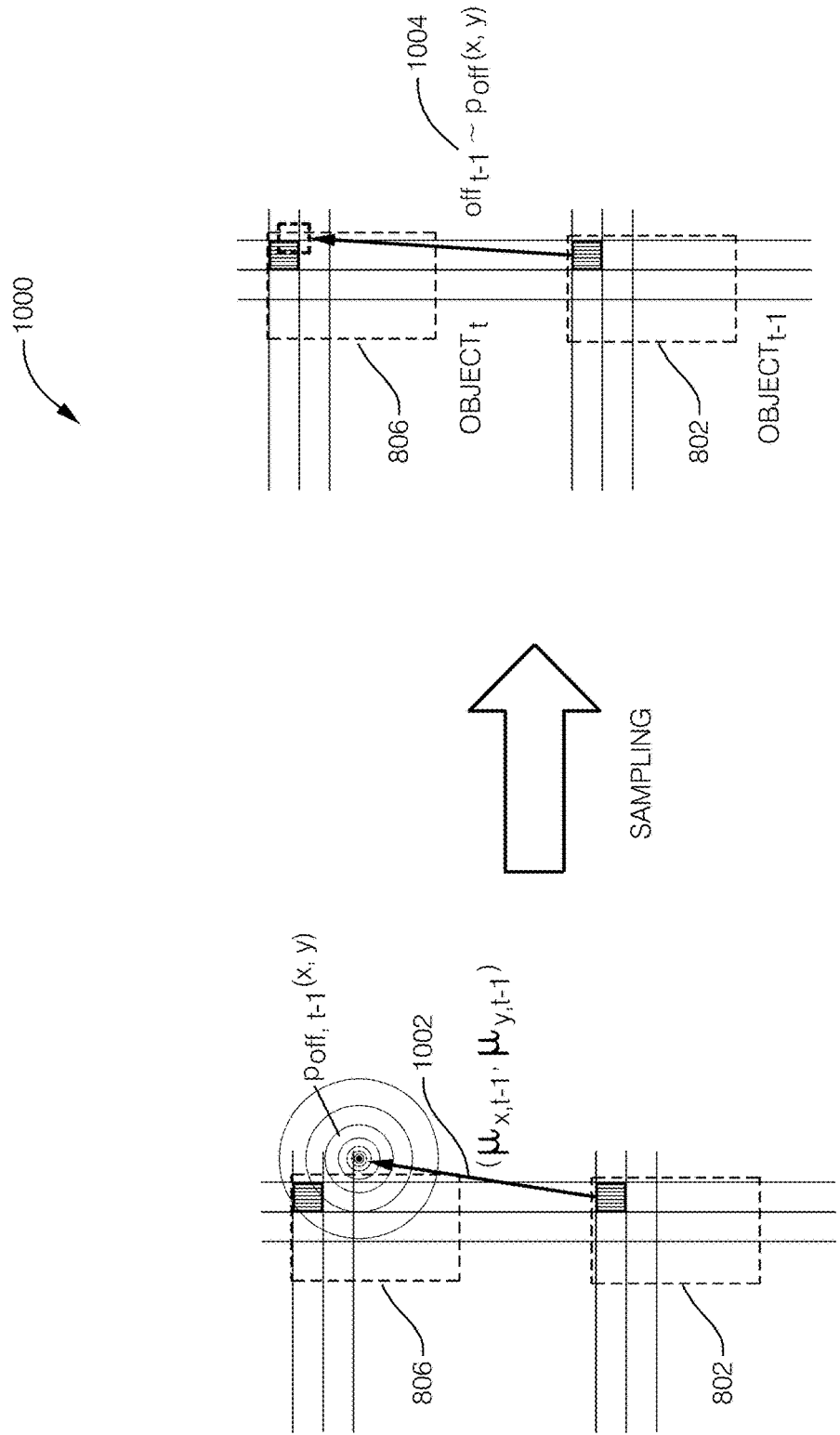
FIG. 10 is an illustration of sampling offsets from a probability distribution according to various embodiments.

FIG. 10 shows an illustration 1000 of sampling offsets from probability distribution p(X, Y) according to various embodiments. Various portions of the illustration 1000 of FIG. 10 may be similar or identical to portions of the illustration 800 of FIG. 8, so that the same reference signs may be used and duplicate description may be omitted. A isotropic Gaussian distribution is illustrated is illustrated in portion 1002 of FIG. 10. From this Gaussian distribution, sampling may be provided N times. Here, a sample may be a draw from the Gaussian probability distribution as shown in portion 1004 of FIG. 10.

Both Gaussian distributions may be learned by backpropagation using the following Loss function:

$$L = \frac{1}{M} \Sigma_{i=1}^M \frac{1}{2\sigma(x_i)^2}(y_i - f(x_i))^2 + 0.5 * \log(\sigma(x_i)^2)$$

where x is the input data to the network, y is the GT for this input data captured as described previously, and M stands for M batches during training for one epoch.

For N samples from $N(\mu_x, \sigma_x)$ and $N(\mu_y, \sigma_y)$, N matchings between $E(H_{t-1, N'}, \alpha_t)$ and $E(I_t, \alpha_t)$ may be then calculated by a dot product as described previously. Resulting values may then be normalized by a softmax function across all N entries. As a result, N similarity scores per cell define to what extent features in $h_{t-1}$ are projected to each of N target positions. Therefore, $h_{t-1}$ for each projection may be weighted with the associated similarity scores and then N resulting features may be projected based on the N previously sampled offsets $\text{off}_{t,N}$.

As illustrated in FIGS. 4, 5, 6, 7, 8, 9, and 10, the input $I_t$ to the RNN may be extended by the projected offsets $\text{off}_{t-1}'$ activated by a tanh function.

Furthermore, offsets may be defined by Gaussian Distributions $X = N(\mu_x, \sigma_x)$ and $Y = N(\mu_y, \sigma_y)$ that are learned by backpropagation. For every iteration, N offsets may be sampled from X and Y so that N matchings between $E(H_{t-1, N'}, \alpha_t)$ and $E(I_t, \alpha_t)$ are calculated. A softmax function may then be used to calculate normalized similarity scores across all N projections. Projections of $H_{t-1}$ may then be weighted by the softmax normalized similarity score for each target position.

As illustrated in FIGS. 3, 4, 5, 6, 7, 8, 9, and 10, offsets that can be scaled by 1/ΔT may be regressed to represent speed vectors. For example, offsets may be scaled by 1/ΔT to switch from offsets (which may be denoted in meters m) to a velocity (which may be denoted in meters per second, m/s). Regression may be done as described above by utilizing regression loss functions. For a system that consumes radar data to perform grid segmentation, i.e. split the area around the car into equally sized grid cells and then classify each cell individually as being drivable, nondrivable, moving vehicle, etc., regressed speed vectors per cell may be used to enrich predicted grid segmentation by scene dynamics. Furthermore, embeddings $E(H_{t-1}', \alpha_t)$ and $E(I_t, \alpha_t)$ as described above may be used to track instances between frames on a cell level.

Figure 11A:
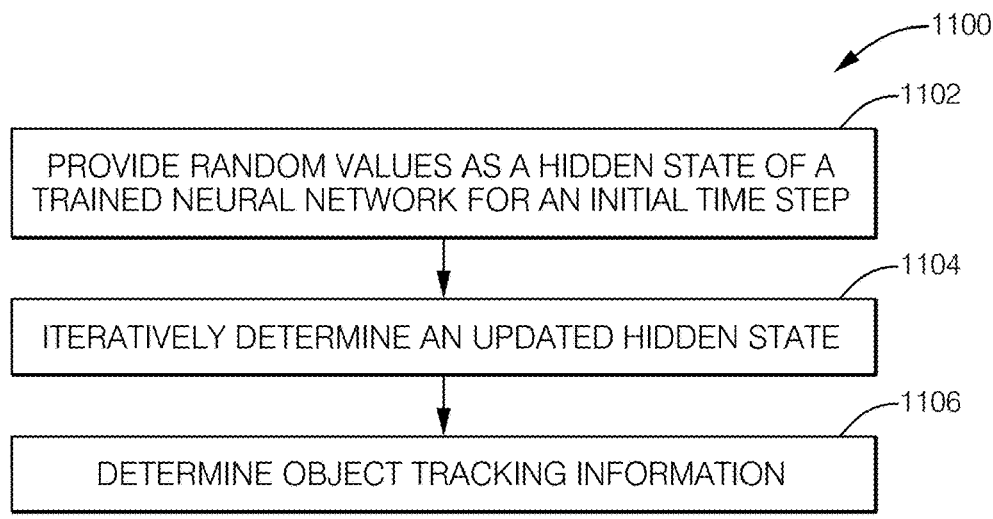
FIG. 11A and FIG. 11B are flow diagrams illustrating a method for object tracking according to various embodiments.

FIG. 11A shows a flow diagram 1100 illustrating a method for object tracking according to various embodiments. At 1102, random values may be provided as a hidden state of a trained neural network for an initial time step, wherein the hidden state represents an encoding of sensor data acquired over consecutive time steps in a grid structure, and wherein the hidden state further represents an offset indicating a movement of the object between the consecutive time steps. At 1104, an an updated hidden state may be determined iteratively by processing a present hidden state and present sensor data using the trained neural network. At 1106, object tracking information may be determined based on the updated hidden state.

Figure 11B:
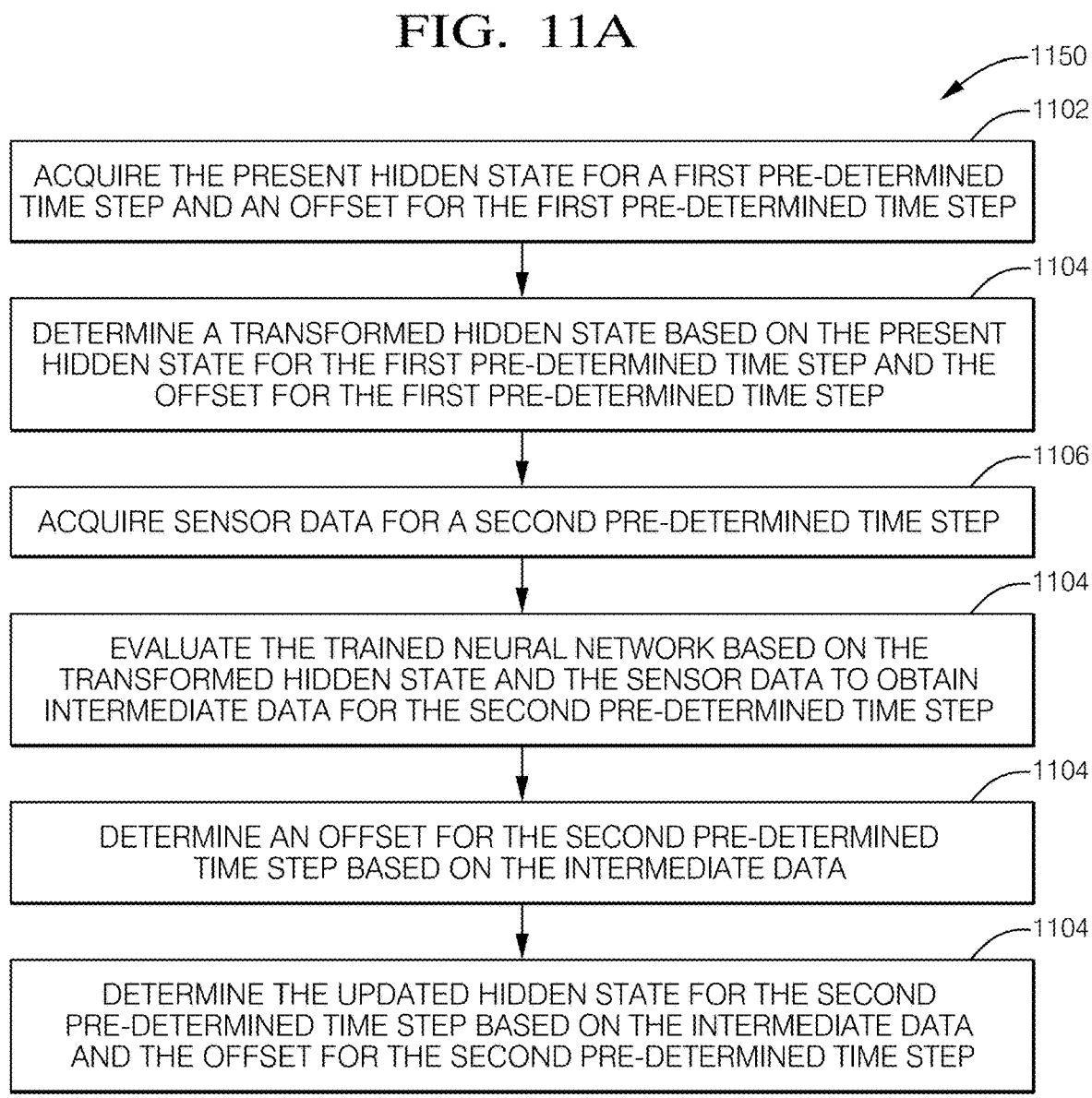

FIG. 11B shows a flow diagram 1150 illustrating the iterative determination of an updated hidden state (as shown in 1104 in FIG. 11A). At 1152, the present hidden state for a first pre-determined time step and an offset for the first pre-determined time step may be acquired. At 1154, a transformed hidden state may be determined based on the present hidden state for the first pre-determined time step and the offset for the first pre-determined time step. At 1156, sensor data for a second pre-determined time step may be acquired. At 1158, the trained neural network may be evaluated based on the transformed hidden state and the sensor data to obtain intermediate data for the second pre-determined time step. At 1160, an offset for the second pre-determined time step may be determined based on the intermediate data. At 1162, the updated hidden state for the second pre-determined time step may be determined based on the intermediate data and the offset for the second pre-determined time step.

According to various embodiments, the object may include or may be an ego vehicle.

According to various embodiments, the object may include or may be an object different from an ego vehicle.

According to various embodiments, the offset for the first pre-determined time step may be determined based on the present hidden state of the first pre-determined time step.

According to various embodiments, the updated hidden state may be determined further based on concatenating the intermediate data and the offset for the second pre-determined time step.

According to various embodiments, the updated hidden state may be determined further based on the offset for the first pre-determined time step.

According to various embodiments, the updated hidden state may be determined further based on a mean of the offset for the first pre-determined time step and the offset for the second pre-determined time step.

According to various embodiments, the updated hidden state may be determined further based on an attention method based on the offset for the first pre-determined time step and the offset for the second pre-determined time step.

According to various embodiments, the method may further include determining second intermediate data based on the transformed hidden state using a matching method. According to various embodiments, the trained neural network may be evaluated based on the second intermediate data. The transformation within the recurrent neural network may be evaluated based on the matching method.

According to various embodiments, the matching method comprises determining a similarity between an embedding vector of the first pre-determined time step and an embedding vector of the second pre-determined time step.

According to various embodiments, the embedding vector of the first pre-determined time step comprises an embedding based on the transformed hidden state for the first pre-determined time step.

According to various embodiments, the embedding vector of the second pre-determined time step comprises an embedding based on the sensor data for the second pre-determined time step.

According to various embodiments, the similarity is determined based on a dot product between the embedding vector of the first pre-determined time step and the embedding vector of the second pre-determined time step.

According to various embodiments, the updated hidden state for the second pre-determined time step may be determined based on speed matching.

According to various embodiments, the offset for the second pre-determined time step may be determined based on sampling.

According to various embodiments, the sampling may be based on Gaussian distribution.

According to various embodiments, the trained neural network may include or may be a recurrent neural network, for example at least one of long short-term memory (LSTM) or gated recurrent units (GRUs).

According to various embodiments, the method may further include carrying out at least one of object detection or grid segmentation based on the updated hidden state for the second pre-determined time step.

Each of the steps 1102, 1104, 1106, 1108, 1110, 1112 and the further steps described above may be performed by computer hardware components.

Figure 12:
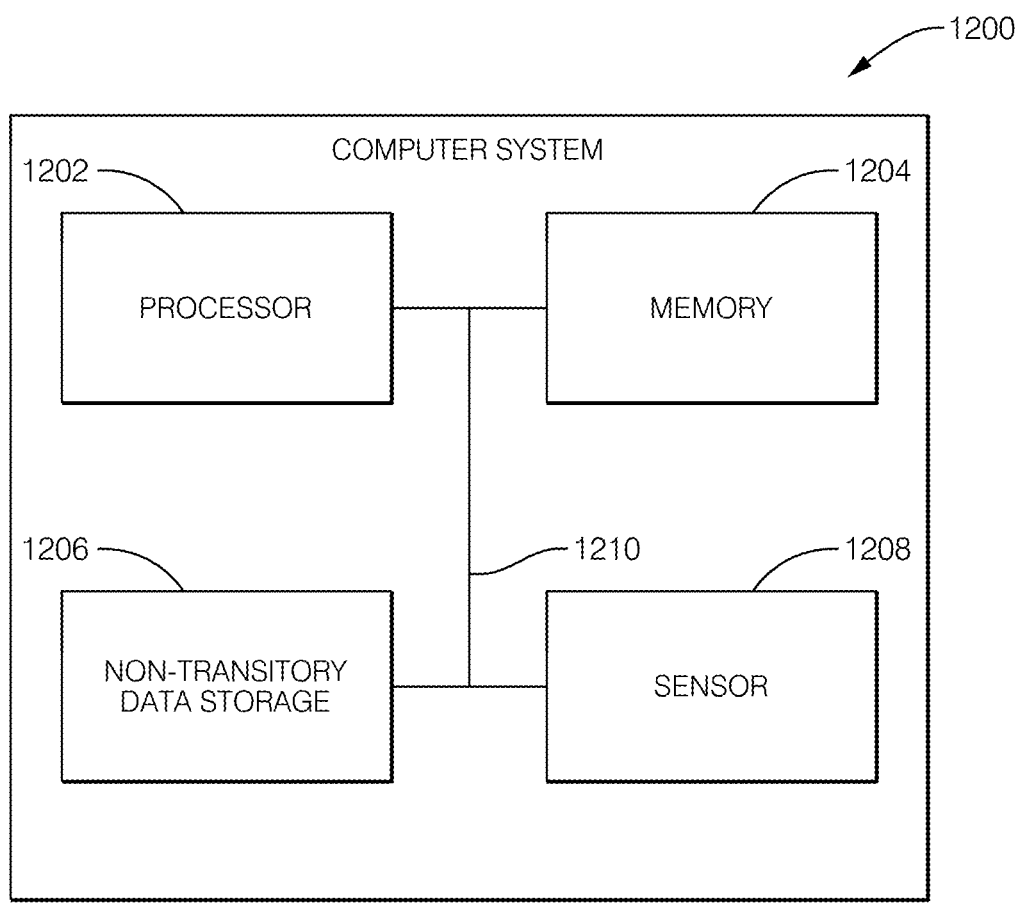
FIG. 12 illustrates a computer system with a plurality of computer hardware components configured to carry out steps of a computer implemented method for processing radar data.

FIG. 12 shows a computer system 1200 with a plurality of computer hardware components configured to carry out steps of a computer implemented method for processing sensor data according to various embodiments. The computer system 1200 may include a processor 1202, a memory 1204, and a non-transitory data storage 1206. A sensor 1208 may be provided as part of the computer system 1200 (like illustrated in FIG. 12), or may be provided external to the computer system 1200.

The processor 1202 may carry out instructions provided in the memory 1204. The non-transitory data storage 1206 may store a computer program, including the instructions that may be transferred to the memory 1204 and then executed by the processor 1202. The sensor 1208 may acquire the sensor data.

The processor 1202, the memory 1204, and the non-transitory data storage 1206 may be coupled with each other, e.g. via an electrical connection 1210, such as e.g. a cable or a computer bus or via any other suitable electrical connection to exchange electrical signals. The sensor 1208 may be coupled to the computer system 1200, for example via an external interface, or may be provided as parts of the computer system (in other words: internal to the computer system, for example coupled via the electrical connection 1210).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 1200.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

REFERENCE NUMERAL LIST 100 illustration of a general structure of a system according to various embodiments
102 Range Doppler map
104 angle finding module
106 polar CNN
108 P2C converter
110 RNN+ module
112 Cartesian CNN
114 object detection head
116 object detection
118 loss function
120 grid segmentation head
122 grid segmentation
124 loss function
200 illustration of recognition of dynamics
202 input
204 convolution
206 hidden state
208 convolution
210 cells
212 convolution
214 operation for weighted sum
216 operation for weighted sum
218 operation for weighted sum
300 illustration of dynamic deformable convolutions
302 DDC
304 RNN
400 illustration of transforming
402 transformation
404 RNN
406 neural network
408 concatenation
500 illustration of transforming
502 mean
600 illustration of transforming
602 sigmoid function
604 multiplication
606 multiplication
608 summation
700 illustration of transforming
702 transformation and matching block
704 speed matching block
800 illustration of functionality within the transformation and matching block
802 object
804 embedding vector
806 object
808 embedding vector
810 offsets
900 illustration of a recurrent module
902 recurrent module
904 neural network
906 matching block
908 neural network
910 operators for a weighted sum
1000 illustration of sampling offsets
1002 illustration Gaussian distribution
1004 illustrating of a sample
1100 flow diagram illustrating method for object tracking according to various embodiments
1102 step of providing random values as a hidden state of a trained neural network for an initial time step
1104 step of iteratively determining an updated hidden state
1106 step of determining object tracking information
1150 flow diagram illustrating determining the updated hidden state
1152 step of acquiring the present hidden state
1154 step of determining a transformed hidden state
1156 step of acquiring sensor data for a second pre-determined time step
1158 step of evaluating the trained neural network
1160 step of determining an offset for the second pre-determined time step
1162 step of determining the updated hidden state
1200 computer system
1202 processor
1204 memory
1206 non-transitory data storage
1208 sensor
1210 connection

What is claimed is:

1. A computer implemented method for tracking an object, the method comprising:
providing random values as a hidden state of a trained neural network for an initial time step, the hidden state representing:
an encoding of sensor data acquired over consecutive time steps in a grid structure, and
an offset indicating a movement of the object between the consecutive time steps;
iteratively determining an updated hidden state by processing a present hidden state and present sensor data using the trained neural network;
determining object tracking information based on the updated hidden state;
acquiring the present hidden state for a first pre-determined time step and an offset for the first pre-determined time step;
determining a transformed hidden state based on the present hidden state for the first pre-determined time step and the offset for the first pre-determined time step;
acquiring sensor data for a second pre-determined time step;
evaluating the trained neural network based on the transformed hidden state and the sensor data for the second pre-determined time step to obtain intermediate data for the second pre-determined time step;
determining an offset for the second pre-determined time step based on the intermediate data; and determining the updated hidden state for the second pre-determined time step based on the intermediate data and the offset for the second pre-determined time step.

2. The method of claim 1, wherein the offset for the first pre-determined time step is determined based on the present hidden state for the first pre-determined time step.

3. The method of claim 1, wherein the updated hidden state is determined further based on at least one of:
concatenating the intermediate data and the offset for the second pre-determined time step;
the offset for the first pre-determined time step;
a mean of the offset for the first pre-determined time step and the offset for the second pre-determined time step; or
an attention method based on the offset for the first pre-determined time step and the offset for the second pre-determined time step.

4. The method of claim 1, further comprising:
determining second intermediate data based on the transformed hidden state using a matching method; and
evaluating the trained neural network based on the second intermediate data.

5. The method of claim 4, wherein using the matching method further comprises:
determining a similarity between an embedding vector of the first pre-determined time step and an embedding vector of the second pre-determined time step.

6. The method of claim 5, wherein the embedding vector of the first pre-determined time step comprises an embedding based on the transformed hidden state for the first pre-determined time step.

7. The method of claim 5, wherein the embedding vector of the second pre-determined time step comprises an embedding based on the sensor data for the second pre-determined time step.

8. The method of claim 5, wherein the similarity is determined based on a dot product between the embedding vector of the first pre-determined time step and the embedding vector of the second pre-determined time step.

9. The method of claim 1, wherein the updated hidden state for the second pre-determined time step is determined based on speed matching.

10. The method of claim 1, further comprising:
performing object detection based on the updated hidden state for the second pre-determined time step.

11. The method of claim 1, further comprising:
performing grid segmentation based on the updated hidden state for the second pre-determined time step.

12. The method of claim 1, wherein the offset for the second pre-determined time step is determined based on sampling.

13. The method of claim 12, wherein the sampling is based on a Gaussian distribution.

14. The method of claim 1, wherein the trained neural network comprises a recurrent neural network.

15. The method of claim 14, wherein the recurrent neural network comprises at least one of long short-term memory (LSTM) or gated recurrent units (GRUs).

16. The method of claim 1, wherein the object comprises an ego vehicle.

17. The method of claim 1, wherein the object comprises an object with movements.

18. A computer system comprising:
a plurality of computer hardware components including a processor; and
a non-transitory computer readable medium comprising instructions, which when executed by the processor, cause the processor to:
provide random values as a hidden state of a trained neural network for an initial time step, the hidden state representing:
an encoding of sensor data acquired over consecutive time steps in a grid structure, and
an offset indicating a movement of an object between the consecutive time steps;
iteratively determine an updated hidden state by processing a present hidden state and present sensor data using the trained neural network;
determine object tracking information for the object based on the updated hidden state;
acquire the present hidden state for a first pre-determined time step and an offset for the first pre-determined time step;
determine a transformed hidden state based on the present hidden state for the first pre-determined time step and the offset for the first pre-determined time step;
acquire sensor data for a second pre-determined time step;
evaluate the trained neural network based on the transformed hidden state and the sensor data for the second pre-determined time step to obtain intermediate data for the second pre-determined time step;
determine an offset for the second pre-determined time step based on the intermediate data; and
determine the updated hidden state for the second pre-determined time step based on the intermediate data and the offset for the second pre-determined time step.

19. A vehicle comprising:
a sensor;
a processor;
a non-transitory computer-readable medium comprising instructions, which when executed by the processor cause the processor to:
provide random values as a hidden state of a trained neural network for an initial time step, the hidden state representing:
an encoding of sensor data from the sensor acquired over consecutive time steps in a grid structure, and
an offset indicating a movement of an object between the consecutive time steps;
iteratively determine an updated hidden state by processing a present hidden state and present sensor data using the trained neural network;
determine object tracking information for the object based on the updated hidden state;
acquire the present hidden state for a first pre-determined time step and an offset for the first pre-determined time step;
determine a transformed hidden state based on the present hidden state for the first pre-determined time step and the offset for the first pre-determined time step;
acquire sensor data for a second pre-determined time step;
evaluate the trained neural network based on the transformed hidden state and the sensor data for the second pre-determined time step to obtain intermediate data for the second pre-determined time step;
determine an offset for the second pre-determined time step based on the intermediate data; and
determine the updated hidden state for the second pre-determined time step based on the intermediate data and the offset for the second pre-determined time step.

* * * * *